Aug. 11, 1931.  G. A. SUNDELL  1,818,285

SCALE

Filed March 12, 1927

Inventor

Gustaf A. Sundell

By W. S. McDowell.

Attorney

Patented Aug. 11, 1931

1,818,285

UNITED STATES PATENT OFFICE

GUSTAF A. SUNDELL, OF COLUMBUS, OHIO, ASSIGNOR TO NATHAN A. HALLWOOD, OF COLUMBUS, OHIO

SCALE

Application filed March 12, 1927. Serial No. 174,725.

This invention relates to improvements in scales, and has particular reference to scales of the type employing balanced beams and provided with weight receivers disposed equidistantly with respect to the pivotal centers of the beams, and wherein weight indicators are included for denoting variations in positions of the beams from their normal balanced positions.

Scales of this type are commonly referred to as under and over-weight scales and the primary object of the present invention is to provide an improved mechanism of a simple and effective character for retaining the beam of a scale of this type and its associated weight indicator in a predetermined position of balance, whereby when the beam is unweighted the same will be restored automatically with its associated indicator to said predetermined position.

Another object of the invention resides in the provision of an under and over-weight scale, wherein the weight indicator is rigidly connected with the beam to oscillate in unison therewith, and wherein an adjustable spring mechanism is provided acting on the beam to resist movement of the latter from its predetermined position of balance.

Another object of the invention resides in the provision of a scale wherein its weighing accuracy is unimpaired by the level of the base or housing of the scale with respect to a true horizontal plane, and one wherein changes in temperature will not affect the scale detrimentally.

With these and other objects in view, as will appear as the description proceeds, the invention consists in the novel features of construction, combinations of elements and arrangements of parts hereinafter to be more fully described and pointed out in the appended claims.

Figure 1:
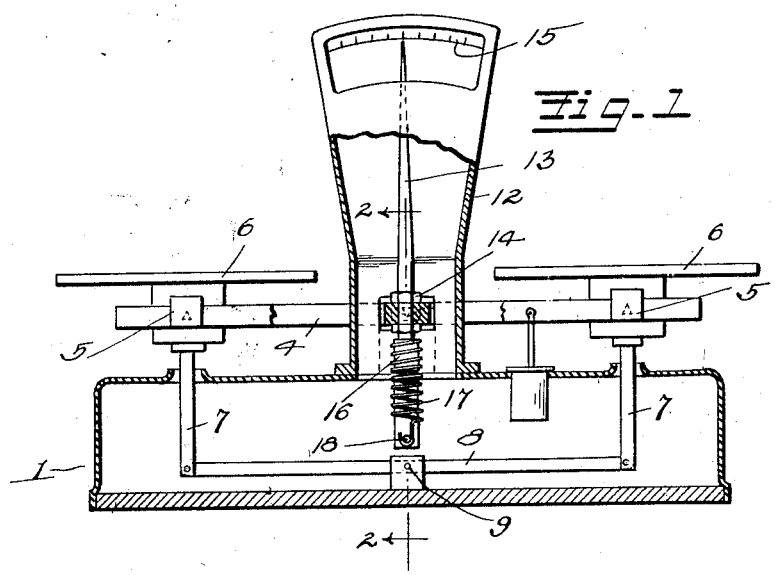
Figure 2:
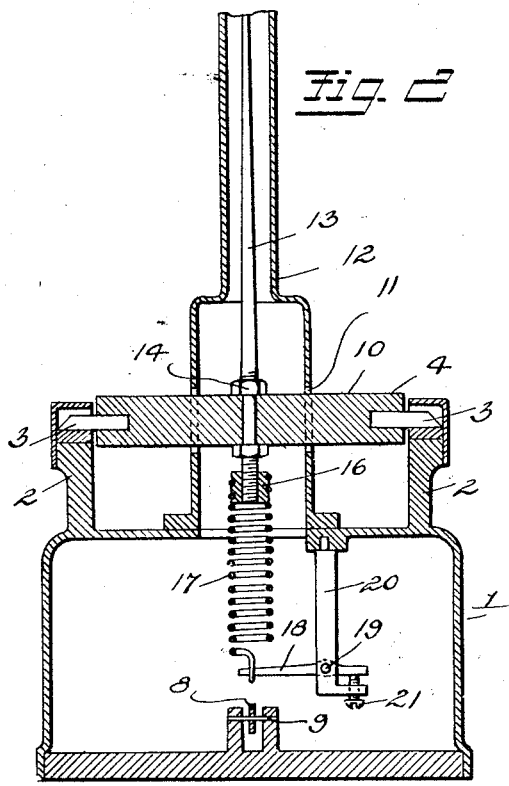
Figure 3:
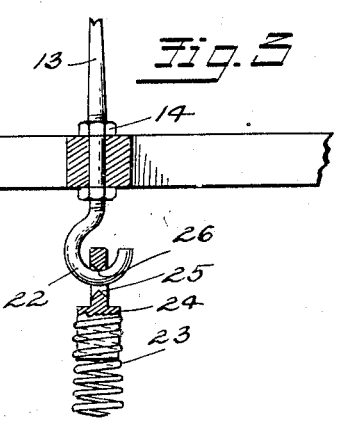

In the accompanying drawings:

Figure 1 is a view in vertical section of a scale constructed in accordance with the present invention, Figure 2 is a vertical transverse sectional view on the plane indicated on the line 2—2 of Figure 1, Figure 3 is a detail view of a slightly modified form of the invention.

Referring more particularly to the drawings the numeral 1 designates the base of a scale, which is provided at the top thereof with transversely spaced bearings 2 for the reception of the knife edge fulcrums 3 of a balanced weighing beam or lever 4. The outer ends of the beam or lever carry knife edge fulcrums 5 which are employed to support a pair of longitudinally spaced weight receivers 6. These receivers include depending stems 7, arranged within the base 1, to the lower ends of which are pivotally connected the opposite longitudinal ends of a check rod 8. The center of this rod is pivoted, as usual, to the base 1 as indicated by the numeral 9 in vertical alignment with the fulcrums 3, whereby the beam 4, of the weight receivers and the check rod produce the necessary parallelogram figure characteristic of scales of this type.

The beam includes a transversely extending cross web 10, which is positioned freely for movement within openings 11 provided in a tower 12, arising from the top of the base 1. The center of this web is provided with an opening for the reception of the lower portion of a weight indicating arm 13, the latter being rigidly secured to the web by means of threaded binding nuts 14, in order to provide an arrangement whereby the arm will oscillate unitarily with the beam about its fulcrum centers 3. The upper end of the arm 13 is movable over a graduated surface 15 arranged in the top of the tower 12, and by noting the positions of the upper end of the arm with respect to the surface 15 the balance of the beam may be accurately and readily determined.

In order to maintain the beam in a predetermined position of balance, with the indicator arm on the zero position of the scale 15, the lower portion of the arm 13 is extended below the beam and is threaded for the reception of a collar 16. To the upper end of this collar there is secured rigidly the upper coils of a helical spring 17, the lower portion of said spring being connected with a movable arm 18, which is pivotally mounted as at 19, on a stationary bracket 20 carried by the base of the scale. The bracket 20 is formed with a foot for the reception of a set screw 21, which upon rotation causes the rocking of the arm 18 about the pivot 19, and thereby regulates the degree of tension applied to the spring 17.

In view of the foregoing it will be seen that when the beam or lever 4 is unweighted, the action of the spring 17 will have to return the beam to a normal position, as indicated in Figure 1. Any movement of the beam from this position will be resisted by the action of the spring. The construction provides for a scale of the under and overweight variety which will possess a very high degree of accuracy, combined with extreme simplicity in design. Due to the simplicity of its construction the scale is not likely to become out of order or to require frequent repairs or adjustments of parts. The strain on the spring in normal operation is substantially negligible and consequently there is but slight danger of the breakage of this element. To further minimize the strain on the spring a construction such as has been shown in Figure 3 may be used, wherein the arm 18 terminates at its lower end in a hook or eye shaped member 22, to which the upper end of a coil spring 23 is secured. The spring 23 has its upper end connected with a collar 24, which includes an eye 25 having knife edges 26 with which the hook 22 engages. This construction serves to minimize distortion of the spring and limits the action thereof to straight tension and compression movements, thereby reducing the possibility of spring breakage.

What is claimed is:

1. In a scale, a base, an even balance beam pivotally mounted upon said base, an indicator tower arising from said base, an indicating arm secured to said beam at a position in alignment with the pivotal axis thereof and arranged to oscillate in unison with said beam, a coil spring arranged within said base, a connection between the upper end of said spring and the lower part of said beam, and an adjustable connection between the lower part of said spring and said base, said adjustable connection permitting the tension of said spring to be varied.

2. In a scale, a base, a beam pivotally mounted upon said base, an indicator arm rigidly connected with said beam in alignment with the pivotal center thereof, said arm being extended below the plane of said beam, a coil spring having its upper end connected with the lower extremity of said arm, and an adjustable connection between the lower end of said spring and said base.

3. In a scale, a base, an even balance beam, transversely aligned knife edge trunnions projecting from said beam and receivable within bearings formed with said base, said beam including a transversely extending web arranged in the center thereof, a rigid indicating arm having the lower portion thereof fixed to said web in order that the arm will oscillate in unison with said beam, a coil spring situated within said base below said beam, a connection between the upper end of said spring and the lower part of said beam, and a connection between the lower end of said spring and said base, said spring being situated normally in alignment with the longitudinal axis of said arm.

4. In a scale, a base, an even balance beam pivotally mounted on said base, an indicator arm rigidly connected to said beam at a position in alignment with the pivotal axis thereof and arranged to oscillate in unison with said beam, a threaded projection depending from the central portion of said beam, a coil spring having its upper end adjustably secured to said projection, and a connection between the lower end of said spring and said base.

5. In a scale, a base, an even balance beam pivotally mounted on said base, a depending projection carried by said beam and located in alignment with the pivotal axis of the beam, a collar threadedly received upon said projection, a helical spring having its top coils surrounding said collar and secured thereto, and a connection between the lower end of said spring and said base.

6. In a scale, a base, an even balance beam pivotally mounted on said base, a member carried by the under side of said beam and located in alignment with the pivotal axis thereof, a helical spring stationarily fixed at one end and having the coils of its opposite end surrounding said member and connected thereto, and a weight indicator arm actuated by said beam, said spring serving to maintain said beam and arm in a predetermined normal position when the beam is unweighted.

In testimony whereof I affix my signature.

GUSTAF A. SUNDELL.